3,558,600
ALKYL SULFATE SALTS OF 1-(p-CHLOROBENZ-HYDRYL)-4-METHYLHOMOPIPERAZINES

Adolph Oscar Geiszler, Mundelein, and Peter Hadley Jones, Lake Forest, Ill., assignors to Abbott Laboratories, North Chicago, Ill., a corporation of Illinois
No Drawing. Filed July 28, 1967, Ser. No. 656,674
Int. Cl. C07d 53/02
U.S. Cl. 260—239          2 Claims

ABSTRACT OF THE DISCLOSURE

Novel long chain alkyl sulfate salts of 1-(p-chlorobenzhydryl)-4-methylhomopiperazine are disclosed. These salt forms mask the bitter taste associated with the free base and soluble acid-addition salt forms of this compound thereby enabling the preparation of an oral dosage form of this antihistaminic and bronchodilating agent.

DESCRIPTION OF INVENTION

This invention is directed to a series of novel salt forms of 1-(p-chlorobenzhydryl) - 4 - methylhomopiperazine consisting of long chain alkyl sulfate salts having from 12 to 22 carbon atoms in the alkyl chain. The free base form of this compound is known in the art and is represented by the following structural formula

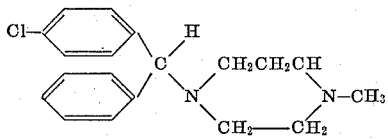

This compound and its non-toxic acid-addition salts are potent antihistaminic agents, and bronchodilators.

Due to the bitter taste associated with the free base form as well as the soluble acid-addition salts of this compound, the only suitable route of administration has been by injection or coated tablets. Chewable tablets and oral suspensions have not been successfully prepared because of this difficulty even though this route of administration is preferred not only because of the faster onset of release of activity, but also because chewable tablets and oral suspensions provide a more convenient dosage form for child patients.

It is therefore one object of this invention to provide a novel salt form of 1-(p-chlorobenzhydryl) - 4 - methylhomopiperazine (hereinafter referred to as homochlorcyclizine). It is another object of this invention to provide a novel salt form of homochlorcyclizine which effectively masks the bitter taste of this drug without diminishing the pharmaceutical activity thereof. Another object of this invention is to provide an oral dosage form of homochlorcyclizine in the form of a chewable tablet. Still another object of the present invention is to provide an oral dosage form of homochlorcyclizine in the form of an oral suspension. These and other objects are obtained by this invention when practiced in accordance with the description following below.

Since the taste factor is a direct function of the taste buds in the mouth, the solubility level of any particular compound in water has an effect on taste. The more insoluble a compound is, the less the taste buds will react to same, thereby minimizing any off-taste. Compounds having long hydrocarbon chains tend to be lipophilic or hydrophobic and therefore, relatively water insoluble. It has been found that for homochlorcyclizine, alkyl sulfate salts having between 12 and 22 carbon atoms in the alkyl chain are sufficiently water insoluble to minimize the reaction of the taste buds to the free base or the acid-addition salts thereby effectively masking the taste without diminishing the level of pharmacological activity.

The alkyl sulfuric acids such as lauryl sulfuric acid ($C_{12}$), myristyl sulfuric acid ($C_{14}$), cetyl sulfuric acid ($C_{16}$), stearyl sulfuric acid ($C_{18}$), arachidyl sulfuric acid ($C_{20}$) and behenyl sulfuric acid ($C_{22}$), as well as those acids containing an odd number of carbon atoms between 13 and 21 are effective to mask the bitter taste of the homopiperazine derivative. These salts may be represented by the following structural formula

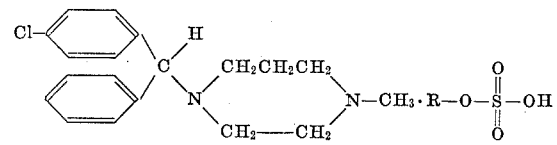

wherein R is an alkyl chain having from 12 to 22 carbon atoms. Although the aforementioned salts are all useful in the practice of this invention, the salt of stearyl sulfuric acid is the preferred embodiment of this invention. It has been found that the stearyl sulfate salt of homochlorcyclizine is completely tasteless and yet is as effective as the free base form of the compound.

The following examples are presented in order to better illustrate the invention and are not intended to limit the scope thereof.

EXAMPLE I

Preparation of stearyl sulfate salt of 1-(p-chlorobenzhydryl)-4-methylhomopiperazine A solution of 31.5 grams (0.10 mole) of 1-(p-chlorobenzhydryl) - 4 - methylhomopiperazine dissolved in 750 ml. acetone is prepared. A second solution of 41.9 grams (0.011 mole) of sodium stearyl sulfate suspended in 750 ml. of distilled water to which is added 58 ml. of glacial acetic acid is prepared. The acetone solution is then poured into the water solution and the resulting mixture is heated to 60° to dissolve the solids.

The clear solution is decolorized with activated carbon and filtered hot through a celite cake filter. After cooling overnight, the solution is filtered and the crystals washed with cold 50% acetone-water solution. The reaction yields 60 grams of the crude stearyl sulfate salt of 1-(p-chlorobenzhydryl) - 4 - methylhomopiperazine having a melting point of 65–68° C. After two recrystallizations from a cold 50% acetone-water solution and drying over $P_2O_5$ for 6 hours at 56° C., the melting point of the purified product rises to 83–85° C.

Following the procedure of Example 1, the lauryl sulfate salt, myristyl sulfate salt, and the cetyl sulfate salt of the homopiperazine derivative can be prepared.

EXAMPLE II

Preparation of chewable tablets

The following description illustrates the manner in which a batch of 1,000 tablets is prepared.

Granules are prepared by milling and blending the following ingredients together and massing same with alcohol.

Part A

|  | Grams |
|---|---|
| (1) Mannitol | 456.0 |
| (2) Sorbitol crystalline | 60.0 |
| (3) Sodium cyclamate | 7.4 |
| (4) Red dye | 0.7 |
| (5) Polyvinylpropylene | 14.7 |

The granules are then dried and sized through an appropriate screen mesh. The following ingredients are separately sized through an appropriate screen mesh and then blended together with 3.0 grams of maraschino cherry flavoring:

Part B

| | Grams |
|---|---|
| (6) Stearyl sulfate salt of 1-(p-chlorobenzhydryl)-4-methylhomopiperazine | 42.8 |
| (7) Carbowax | 12.2 |
| (8) Magnesium stearate | 3.0 |
| (9) Red dye | 0.12 |

The granules from Part A are then added to the blender with the ingredients of Part B and all materials are blended together. The mass is compressed and tablets punched out.

EXAMPLE III

Preparation of oral suspension

The following description details the manner in which a one liter volume of the stearyl sulfate salt of 1-(p-chlorobenzhydryl)-4-methylhomopiperazine as an oral suspension is prepared.

Part A

The following ingredients are ball milled together with water overnight until a fine dispension is achieved.

| | Grams |
|---|---|
| (1) Polyvinylpyrrolidone | 2.00 |
| (2) Dimethylpolysiloxane | 1.00 |
| (3) Stearyl sulfate salt of 1-(p-chlorobenzhydryl)-4-methylhomopiperazine | 8.57 |

Part B

In a separate operation, a solution of preservatives and suspending agents is prepared. A mixture of 0.5 gram of methylparahydroxy benzoate and 0.2 gram of propyl parahydroxy benzoate is added to 70.0 grams of glycerine and a suspension formed, to which is added 4.5 grams of sodium carboxymethyl cellulose. To this suspension is then added 9.0 grams of magnesium aluminum trisilicate (such as that sold under the trade name Veegum by the R. T. Vanderbilt Company, 230 Park Ave., Murray Hill, N.Y.) in 300.0 grams of sorbital solution USP and the mixture is stirred.

The ingredients of Part A and Part B are added together and stirred. The following ingredients are then added and stirred in with the suspension.

(4) Cyclamate sodium powder—2.5 grams
(5) Sodium citrate USP powder—2.5 grams
(6) Sugar cane granules (sucrose USP)—300.0 grams
(7) Yellow dye—35 milligrams
(8) Flavoring, q.s.
(9) Citric acid USP powder, q.s.—pH 7–7.5
(10) Deionized water—1 liter The resulting suspension may then be homogenized if desired, and packaged. The resulting oral suspension contains .25 milligram of activity per 5 ml. of suspension based on the activity of the corresponding activity of the hydrochloride salt of 1-(p-chlorobenzhydryl)-4-methylhomopiperazine.

Others may practice this invention in any of the numerous ways which will be suggested to one skilled in that art upon reading this disclosure. All such practice of the invention is considered to be covered hereby provided it falls within the scope of the appended claims.

We claim:

1. The alkyl sulfate salts of 1-(p-chlorobenzhydryl)-4-methylhomopiperazine having the structural formula

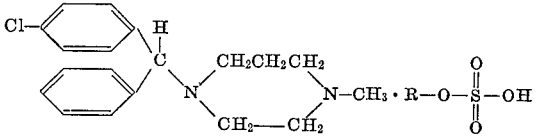

wherein R is alkyl having from 12 to 22 carbon atoms.

2. A compound according to claim 1 wherein R is the stearyl radical.

References Cited

UNITED STATES PATENTS 2,655,498   3/1970   Weston et al. _____ 260—239

ALTON D. ROLLINS, Primary Examiner

U.S. Cl. X.R.

424—244